(No Model.)
C. W. HOFFMAN.
BRAKE FOR DUMB WAITERS.
No. 601,963. Patented Apr. 5, 1898.
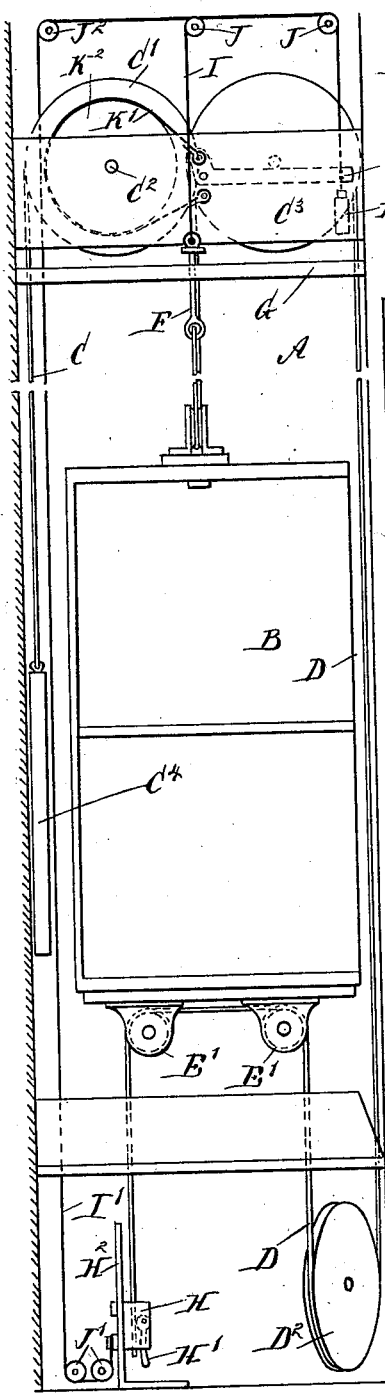
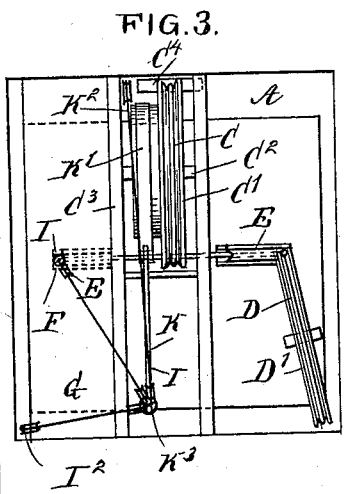
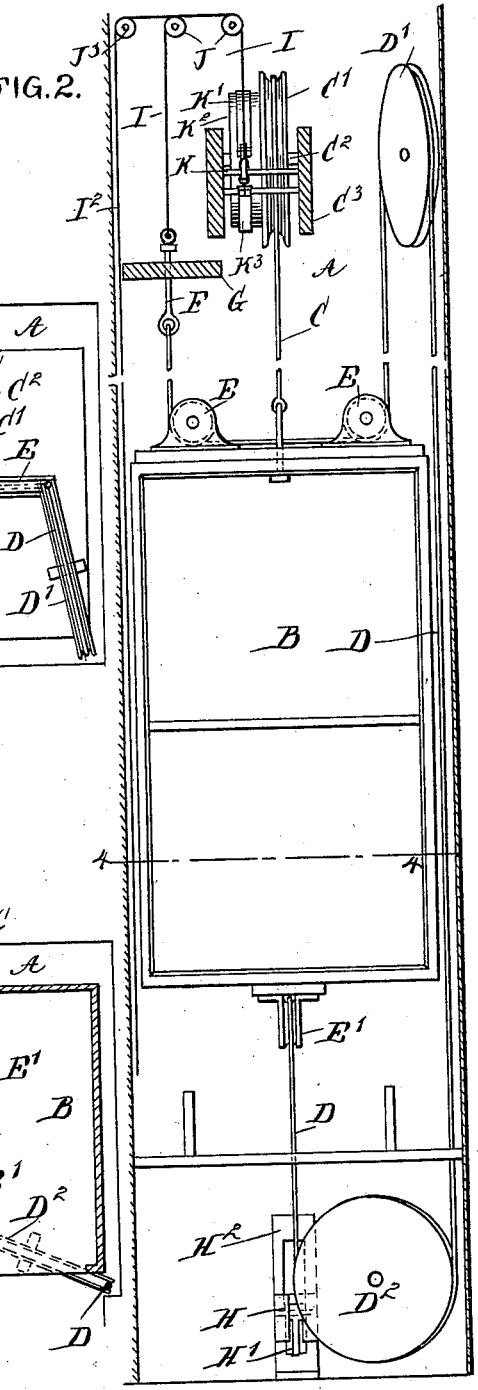
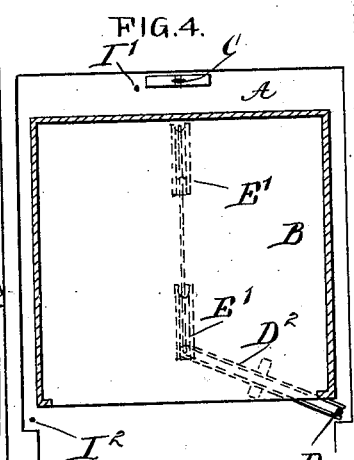
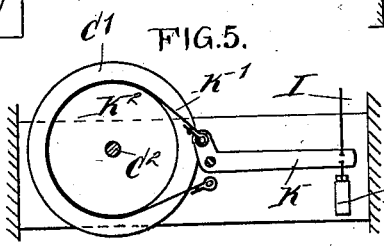
WITNESSES:
Donn Twitchell
Theo. G. Hoster
INVENTOR
C. W. Hoffman.
BY Munn & Co.
ATTORNEYS.
THE NORRIS PETERS CO., PHOTO-LITHO., WASHINGTON, D. C.

UNITED STATES PATENT OFFICE.

CHARLES W. HOFFMAN, OF NEW YORK, N. Y.

BRAKE FOR DUMB-WAITERS.

SPECIFICATION forming part of Letters Patent No. 601,963, dated April 5, 1898.

Application filed January 5, 1898. Serial No. 665,620. (No model.)

*To all whom it may concern:*

Be it known that I, CHARLES W. HOFFMAN, of New York city, in the county and State of New York, have invented a new and Improved Brake for Dumb-Waiters, of which the following is a full, clear, and exact description.

The object of the invention is to provide a new and improved brake mechanism for dumb-waiters which is simple and durable in construction, very effective in operation, not liable to get out of order, and arranged to automatically brake the cage and its load whenever the operator releases the manipulating-rope on both the upward and downward pull.

The invention consists of novel features and parts and combinations of the same, as will be hereinafter fully described, and pointed out in the claims.

Reference is to be had to the accompanying drawings, forming a part of this specification, in which similar characters of reference indicate corresponding parts in all the figures.

Figure 1 is a side elevation of the improvement with the shaft in section. Fig. 2 is a sectional front elevation of the same. Fig. 3 is a plan view of the same. Fig. 4 is a sectional plan view of the same on the line 4 4 of Fig. 2, and Fig. 5 is a sectional side elevation of the brake proper.

In the shaft A is arranged to move a cage B, supported on a counterbalancing mechanism consisting of a rope C, passing over a pulley C', having its shaft $C^2$ journaled in suitable bearings in an overhead framework $C^3$, arranged at or near the top of the shaft A. The downwardly-extending end of the rope C carries the usual counterweight $C^4$ to counterbalance the cage B. The hoisting or manipulating rope D extends in the front of the shaft A and passes at its upper end over a sheave D', to then pass under pulleys E, journaled on the top of the cage B, to connect with a rod F, having a limited sliding motion in a vertical direction in a bearing G, forming part of the framework in the upper end of the shaft A. The lower end of the manipulating-rope D passes around a sheave $D^2$ in the bottom of the shaft and then over pulleys E', secured to the under side of the cage B, the end of the rope being clamped in a slide H by means of a clamping-lever H', as is plainly indicated in Figs. 1 and 2, said slide H having a limited sliding movement on a suitable guideway $H^2$. The slidable rod F has its upper end connected with a rope I, which extends over pulleys J, which rope connects with the outer end of a brake-lever K, fulcrumed on the framework $C^3$ and connected with the usual brake-band K', engaging a brake-pulley $K^2$, secured on the shaft $C^2$ of the counterbalancing device. On the free end of the lever K is arranged a weight $K^3$ for normally holding the brake-band K' in firm engagement with the pulley $K^2$ to brake the latter and consequently the counterbalancing device and the cage. The rope I is also connected with a second rope I', extending within the shaft A and having its other end attached to the slide H, connected with the lower end of the manipulating-rope D. The said second rope I' passes under pulleys J' $J^2$ to properly extend within the shaft A and connect with the rope I, as will be readily understood by reference to Figs. 1 and 2.

Now it is evident that as long as the cage B is at a standstill the weight $K^3$ of the brake-lever K holds the brake applied to prevent the cage from ascending or descending. When the operator desires to raise the cage B, he pulls on the manipulating-rope D in a desired direction, so that a pull is exerted in the same direction on the rope F, which draws on the rope I and thereby causes an upward swinging of the brake-lever K to release the brake-band K' from its pulley $K^2$ and allow of raising the load upon a further pulling of the manipulating-rope D, it being understood that the rod F, after it attains its lowermost position on the bearing G, holds the upper end of the rope D securely in place to cause an upward traveling of the cage B in the usual manner. As soon as the operator releases the pull on the rope D the weight $K^3$ of the brake-lever causes the latter to swing downward to apply the brake-band K' on the pulley $K^2$ and hold the cage B in position. When it is desired to lower the cage B, the operator pulls on the manipulating-rope D in an upward direction, so that the slide H is drawn in a like direction and a pull is exerted on the rope I', and consequently on the rope I, to impart an upward swinging motion to the brake-lever K to release the brake-band K' on the pulley K². A further pull on the rope D draws the cage B downward, as the lower end of the rope D is securely held in place on the slide H, now in its uppermost position.

Now it is evident from the foregoing that whenever the operator releases the manipulating-rope D the weight K³ of the brake-lever at once applies the brake and holds the cage and its load in position, and as soon as the operator pulls on the manipulating-rope in either an upward or downward direction the brake is opened, so that the cage B can ascend or descend, according to the direction in which the rope is pulled.

A third rope I², hanging down in the front portion of the shaft A, may be connected with the rope I to allow the operator to open the brake mechanism without first pulling the rope D. This rope I² is very serviceable for lowering purposes when the cage is sufficiently loaded to overbalance the counterweight.

It is to be understood that other movable pieces connected with the ends of the hoisting-rope may be employed, and the construction of the brake mechanism can be varied without deviating from the spirit of my invention.

Having thus fully described my invention, I claim as new and desire to secure by Letters Patent—

1. In a dumb-waiter, the combination with a cage, of a hoisting-rope therefor, movable pieces with which the ends of the ropes are connected, a brake mechanism, and connections between said movable pieces and said brake mechanism, whereby the brake is released whenever a pull is exerted on the said rope, substantially as shown and described.

2. In a dumb-waiter, the combination with a cage, of a hoisting-rope therefor, slides having a limited sliding motion and with which the ends of the said rope are connected, a brake mechanism normally braking the counterbalance of the dumb-waiter, and connections between the said slides and the said brake mechanism, whereby the brake is released whenever a pull is exerted on said rope, substantially as shown and described.

CHARLES W. HOFFMAN.

Witnesses:
    THEO. G. HOSTER,
    EVERARD B. MARSHALL.